United States Patent
Dziubinschi et al.

(10) Patent No.: US 10,092,985 B2
(45) Date of Patent: Oct. 9, 2018

(54) HEAT EXCHANGER WITH MECHANICALLY OFFSET TUBES AND METHOD OF MANUFACTURING

(71) Applicant: Halla Visteon Climate Control Corp., Daejeon (KR)

(72) Inventors: Orest Alexandru Dziubinschi, Dearborn, MI (US); Kastriot Shaska, Northville, MI (US); Brian James Cardwell, Ypsilanti, MI (US); Steven C. White, Pinckney, MI (US)

(73) Assignee: HANON SYSTEMS, Daejeon-si (KR)

( * ) Notice: Subject to any disclaimer, the term of this patent is extended or adjusted under 35 U.S.C. 154(b) by 384 days.

(21) Appl. No.: 14/705,254

(22) Filed: May 6, 2015

(65) Prior Publication Data

US 2016/0327346 A1 Nov. 10, 2016

(51) Int. Cl.

| F28F 1/06 | (2006.01) |
|---|---|
| B23P 15/26 | (2006.01) |
| B21C 37/15 | (2006.01) |
| B21C 23/08 | (2006.01) |
| F28F 13/12 | (2006.01) |
| F28D 1/053 | (2006.01) |
| F28F 1/02 | (2006.01) |
| F28D 21/00 | (2006.01) |

(52) U.S. Cl.
CPC ............ B23P 15/26 (2013.01); B21C 23/085 (2013.01); B21C 37/151 (2013.01); F28D 1/05383 (2013.01); F28F 1/022 (2013.01); F28F 1/025 (2013.01); F28F 13/12 (2013.01); F28D 2021/0089 (2013.01); F28F 2255/16 (2013.01)

(58) Field of Classification Search
CPC .................................. F28F 1/022; F28F 1/025
USPC ......................................................... 165/177
See application file for complete search history.

(56) References Cited

U.S. PATENT DOCUMENTS

| 3,596,495 A * | 8/1971 | Huggins ................ B21D 53/08 |
| | | 165/109.1 |
| 7,059,399 B2 * | 6/2006 | Chin et al. .......... F28D 1/05391 |
| | | 165/146 |
| 7,726,390 B2 * | 6/2010 | Sucke et al. .......... B21C 35/023 |
| | | 165/177 |
| 2010/0115771 A1 * | 5/2010 | Johnson et al. ..... B23K 1/0012 |
| | | 29/890.052 |

(Continued)

FOREIGN PATENT DOCUMENTS

| JP | H02129494 A | 5/1990 |
| JP | 2004085142 A | 3/2004 |

(Continued)

*Primary Examiner* — Allen Flanigan
(74) *Attorney, Agent, or Firm* — Shumaker, Loop & Kendrick, LLP; James D. Miller (57) ABSTRACT

An extruded multi-port tube for use in a heat exchanger comprises a main body extending longitudinally from a first end to a second end thereof. The main body is divided into a plurality of longitudinally extending segments. Each of the ports formed in the main body extend from the first end to the second end thereof for conveying a fluid therethrough. Each of the ports extend substantially parallel to the main body along each of the segments thereof. Both the main body and each of the ports of one of the segments are offset laterally relative to both the main body and each of the ports of an adjacent one of the segments.

12 Claims, 4 Drawing Sheets

(56) References Cited

U.S. PATENT DOCUMENTS

2011/0146594 A1\* 6/2011 Smelcer ................. F24H 1/287
    122/18.3
2013/0126141 A1 5/2013 Cho et al.
2013/0264031 A1\* 10/2013 Plourde et al. ......... B23P 15/26
    165/104.11

FOREIGN PATENT DOCUMENTS

| JP | 2005529304 A | 9/2005 |
| JP | 2012225521 A | 11/2012 |
| JP | 2014051953 A | 3/2014 |

\* cited by examiner

HEAT EXCHANGER WITH MECHANICALLY OFFSET TUBES AND METHOD OF MANUFACTURING

FIELD OF THE INVENTION

The invention relates to a heat exchanger, and more specifically to a heat exchanger tube having a laterally offset segment for promoting turbulence within the heat exchanger tube.

BACKGROUND OF THE INVENTION

Heat exchangers are commonly found in many systems where it is necessary for the heat energy of one fluid to be exchanged with the heat energy of another fluid for a variety of different technical reasons. The exchange of heat may be related to the utilizing of a maximum amount of available energy within the system or may in other cases be related to heating or cooling a medium that is then used to regulate a temperature of an object or an environment.

Heat exchangers typically include a plurality of heat exchanger tubes that extend between an inlet header and an outlet header. The heat exchanger tubes carry a first fluid therein while a second fluid is passed over or between the heat exchanger tubes. In some instances, a plurality of fins or other surface area increasing features may extend from one heat exchanger tube to an adjacent heat exchanger tube. The heat energy must be exchanged between the two fluids via walls of the heat exchanger tubes, hence an efficiency of the heat exchanger is largely dependent on the ability of either of the first fluid and the second fluid to transfer heat energy through walls of the tubes.

One method of increasing the heat transfer between a fluid and the wall of the tube is to increase the turbulence of the fluid at a boundary between the fluid and the wall of the tube in order to reduce the thermal boundary layer thickness. However, highly efficient heat exchangers that promote turbulence in one of the fluids flowing through the heat exchanger often require exceedingly complex modifications to the interior of the heat exchanger tube. For example, the heat exchanger tube may be modified by the addition of an internal insert that increases the turbulence of the fluid flowing therein or the heat exchanger tube may require a complex manufacturing process to introduce additional internal features for increasing the turbulence of the fluid. In either case, the cost and complexity of producing such turbulence inducing features within the heat exchanger tube may be cost prohibitive.

One form of heat exchanger that may require an increase of turbulence within the heat exchanger tube is the Transmission Oil Cooler (TOC). A common and cost effective method of forming a TOC includes extruding aluminum to form elongated multi-port tubing. However, creating additional physical features to increase the turbulence in the laminar flow of the oil used in the TOC is difficult and expensive within the multi-port extruded tube due to the use of complex and expensive manufacturing processes.

It would therefore be desirable to produce heat exchanger tubes manufactured using a low cost extrusion process while maintaining a high heat transfer efficiency through the introduction of turbulence within the extruded heat exchanger tubes.

SUMMARY OF THE INVENTION

Compatible and attuned with the present invention, an extruded multi-port heat exchanger tube having at least one lateral offset formed therein for increasing the turbulence within each port of the heat exchanger tube has surprisingly been discovered.

In one embodiment of the invention, a tube for use in a heat exchanger comprises a main body having a longitudinal axis and a first end and a second end. At least one port is formed through the main body from the first end to the second end for conveying a fluid therethrough. The main body is divided into a plurality of longitudinally extending segments, wherein the at least one port formed in one of the segments is offset laterally from the at least one port formed in an adjacent one of the segments.

In another embodiment of the invention, a heat exchanger comprises an inlet header, an outlet header, and a plurality of tubes. Each of the tubes comprises a main body having a longitudinal axis and a first end and a second end. At least one port is formed through the main body from the first end to the second end of each of the tubes for conveying a fluid therethrough. The main body of each of the tubes is divided into a plurality of longitudinally extending segments, wherein the at least one port formed in one of the segments is offset laterally from the at least one port formed in an adjacent one of the segments.

A method of forming a tube is also disclosed. The method comprises the steps of extruding a main body longitudinally from an extrusion die in a first direction, wherein the extruding of the main body includes the formation of at least one port therein for conveying a fluid through the main body; applying a force along a first portion of the main body in a second direction transverse to a longitudinal axis of the main body; and deforming the first portion of the main body and the at least one port formed therein to be laterally offset relative to a second portion of the main body formed adjacent the first portion.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
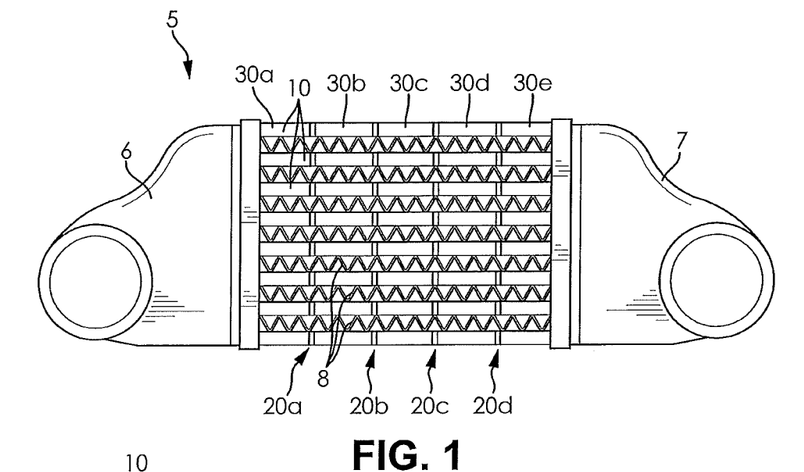
FIG. 1 is front elevational view of a heat exchanger according to an embodiment of the invention.

FIG. 1 illustrates a heat exchanger 5 according to one embodiment of the invention. The heat exchanger 5 may be any form of heat exchanger, including a Transmission Oil Cooler (TOC) having transmission oil of a vehicle flowing therethrough. A plurality of tubes 10 is arranged in parallel and extends between an inlet header 6 and an outlet header 7 of the heat exchanger 5 for conveying a first fluid therethrough. The inlet header 6 may be any structure suitable for distributing a flow of the first fluid to each of the tubes 10 for delivery to the outlet header 7. Similarly, the outlet header 7 may be any structure suitable for collecting and recombining the distributed flows from the plurality of tubes 10. The tubes 10 may be spaced apart from each other in a direction perpendicular to a longitudinal axis of each of the tubes 10 to allow for a second fluid to flow therebetween. Heat energy is then transferred between the first and the second fluids through the wall of each of the tubes 10. In some circumstances, a plurality of surface area increasing features such as fins 8 may extends between the spaced apart tubes 10 to increase a total heat exchanging surface area between the inlet header 6 and the outlet header 7, thereby increasing the efficiency of the heat exchanger 5.

Figure 2:
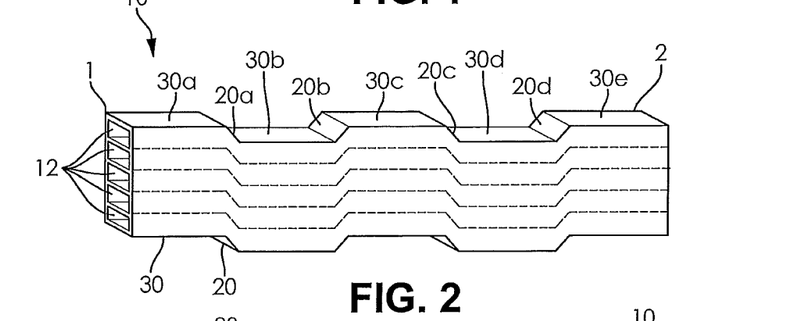
FIG. 2 is a top perspective view of a heat exchanger tube having a plurality of offset segments for use in the heat exchanger illustrated in FIG. 1.
Figure 4:
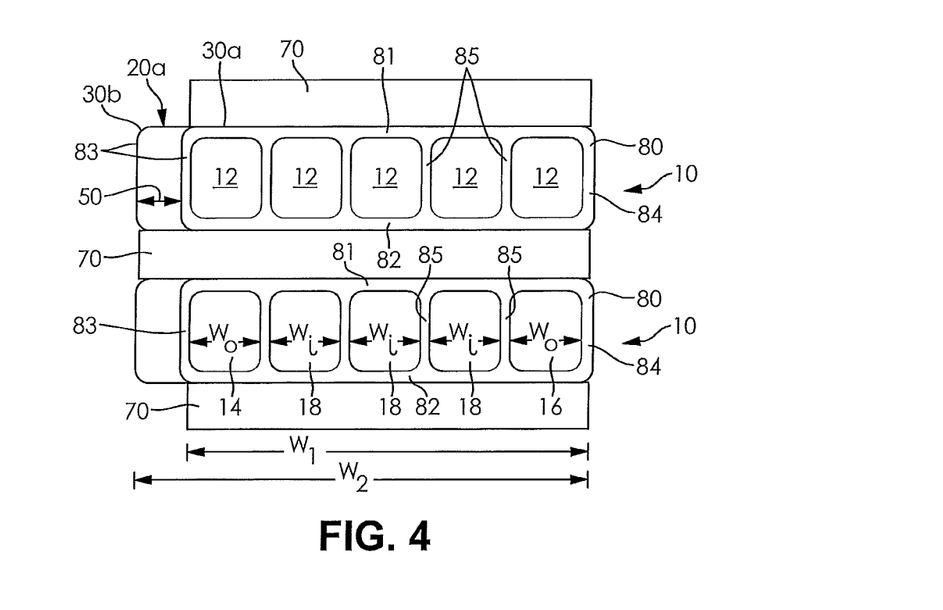
FIG. 4 is a side elevational view of a pair of heat exchanger tubes having surface area increasing features extending therebetween.

FIG. 2 illustrates one of the tubes 10 of the heat exchanger 5. The tube 10 may be comprised of an extruded main body including a plurality of ports 12 formed therein, wherein each of the ports 12 is a void formed in the main body during an extrusion process. Although described herein as extruded, other processes can be used to produce the tube 10 as desired. The plurality of ports 12 extend in a longitudinal direction of the tube 10 from a first end 1 to a second end 2 thereof. The tube 10 may have a substantially rectangular cross-sectional shape as it extends from the first end 1 to the second end 2, wherein the plurality of ports 12 may be arranged linearly in an array extending in the elongated direction of the cross-section of the tube 10, as best shown in FIGS. 2 and 4. The broken lines included in FIG. 2 generally indicate a division between adjacent ones of the ports 12 within an interior of the tube 10 and along a length thereof. Each of the ports 12 may be a passageway formed through the tube 10 for communicating the first fluid from the first end 1 to the second end 2 of the tube 10. The tubes 10 shown in FIGS. 2 and 4 have five of the ports 12 formed therein, but the tube 10 may have any number of the ports 12 formed therein while remaining within the scope of the present invention. If the ports 12 are arranged next to each other in the elongate, direction of the cross-section of the tube 10 as shown in FIGS. 2 and 4, the ports 12 may each have a substantially rectangular cross-sectional shape. However, it should be understood that other cross-sectional shapes of the ports 12 may be utilized while remaining within the scope of the present invention, including elliptical or circular shapes, for example.

The tube 10 further includes a plurality of lateral offsets 20 formed therein. The lateral offsets 20 separate the tube 10 into a plurality of segments 30. Accordingly, each of the lateral offsets 20 forms a transition region of the main body of the tube 10 from one of the segments 30 to an adjacent one of the segments 30. The tube 10 is shown in FIG. 2 as having a first segment 30a transitioning to a second segment 30b at a first lateral offset 20a, the second segment 30b transitioning to a third segment 30c at a second lateral offset 20b, the third segment 30c transitioning to a fourth segment 30d at a third lateral offset 20c, and the fourth segment 30d transitioning to a fifth segment 30e at a fourth lateral offset 20d. Each of the segments 30 is arranged in parallel and in the direction of the longitudinal axis of the tube 10. Each of the lateral offsets 20 forms a portion of the tube 10 that extends at least partially in a direction transverse to the longitudinal axis of the tube 10. Each of the ports 12 formed in the tube 10 also includes a plurality of longitudinally extending segments as well as a plurality of transition segments interconnecting the longitudinally extending segments, wherein each of the transition segments extends at least partially in the direction transverse to the longitudinal axis of the tube 10. Each of the longitudinally extending segments corresponds to one of the segments 30 of the tube 10 while each of the transition segments corresponds to one of the transition regions formed by one of the lateral offsets 20 formed in the tube 10.

Figure 3A:
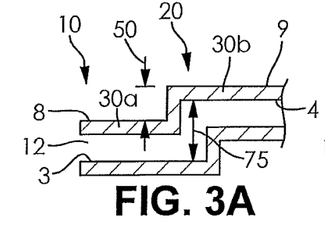
FIG. 3A is a fragmentary cross-sectional view of a lateral offset formed in a heat exchanger tube according to one embodiment of the invention.
Figure 3B:
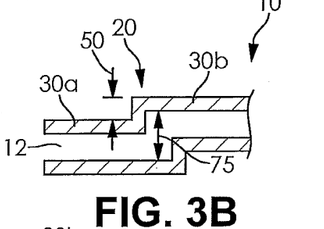
FIG. 3B is a fragmentary cross-sectional view of a lateral offset formed in a heat exchanger tube according to a another embodiment of the invention.
Figure 3C:
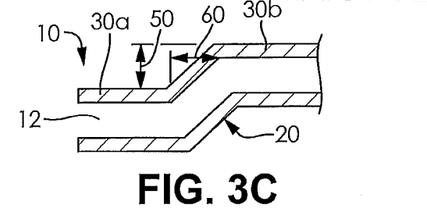
FIG. 3C is a fragmentary cross-sectional view of a lateral offset formed in a heat exchanger tube according to a another embodiment of the invention.

Each of the lateral offsets 20 may include both an offset length 50 and a transition length 60 as each of the lateral offsets 20 connect one of the segments 30 to an adjacent one of the segments 30. FIGS. 3A, 3B, and 3C illustrate an enlarged view of a lateral offset 20 formed in a tube 10 having a single port 12 formed therethrough. As explained hereinabove, any number of the ports 12 may be formed through the tube 10, but FIGS. 3A, 3B, and 3C include a single one of the ports 12 for the purposes of clarity. The lateral offset 20 shown in FIG. 3A is shown as having an offset length 50 measured in a direction perpendicular to the longitudinal axis of the tube 10, wherein the offset length 50 represents a distance between one feature of the tube 10 along the first segment 30a thereof to a corresponding feature of the tube 10 along an adjacent second segment 30b thereof. For example, the offset length 50 illustrated in FIG. 3A is measured from an outermost lateral surface 8 of the tube 10 along the first segment 30a to an outermost lateral surface 9 of the tube 10 along the adjacent second segment 30b in a direction of the lateral offset between the segments 30a, 30b. It should be understood by one skilled in the art that any other feature of the tube 10 along the first segment 30a thereof will be offset laterally by a distance substantially equal to the offset length 50 from the same feature along the second segment 30b of the tube 10 in addition to the outermost lateral surface. For example, any portion of a surface defining the port 12 within the tube 10 is similarly offset laterally between the first segment 30a and the second segment 30b by a distance substantially equal to the offset length 50.

Figure 7:
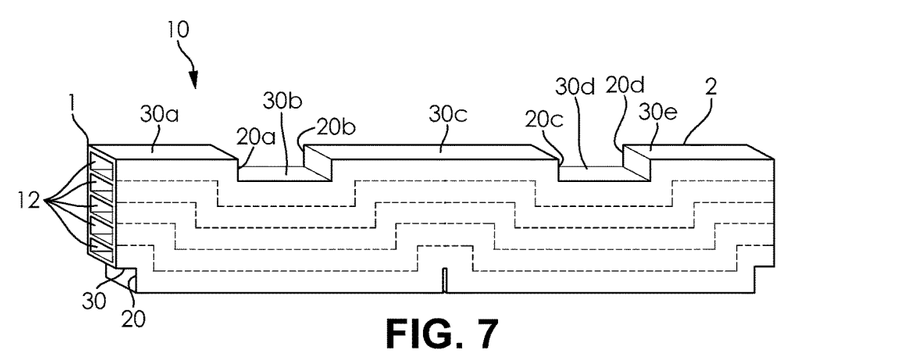
FIG. 7 is a top perspective view of a heat exchanger tube having a plurality of offset segments according to the embodiment shown in FIG. 3A for use in the heat exchanger illustrated in FIG. 1.

The lateral offset 20 shown in FIG. 3A and FIG. 7 further illustrates a port transition width 75 measured in a direction perpendicular to the longitudinal axis of the tube 10. The port transition width 75 represents the distance from a first interior surface 3 of the port 12 along the first segment 30a to a second interior surface 4 of the port 12 along the second segment 30b, wherein the first interior surface 3 and the second interior surface 4 represent surfaces of the port 12 that are arranged opposite to each other in a direction perpendicular to the longitudinal axis of the tube 10 and parallel to the direction of the offset length 50. The port offset is great enough in FIG. 3A to cause the portion of the port 12 formed in the second segment 30b to be spaced apart laterally from the portion of the port 12 formed in the first segment 30a in a manner wherein the port 12 along the first segment 30a and the port 12 along the second segment 30b do not have any portions thereof that are in alignment with each other in the longitudinal direction of the tube 10. In other words, the port transition width 75 is greater than two times an inner diameter of the port 12 along each of the segments 30a, 30b, wherein the inner diameter of the port 12 is measured across the port 12 in the direction of the offset length 50.

In contrast, the lateral offset 20 shown in FIG. 3B includes a port transition width 75 that is less than two times the inner diameter of the port 12 as measured in a direction of the offset length 50. Accordingly, at least a portion of the port 12 of the first segment 30a and a portion of the port 12 of the second segment 30b will overlap each other and be at least partially aligned in the longitudinal direction of the tube 10. It should be understood by one skilled in the art that the port transition width 75 may be selected to promote desirable flow characteristics within each of the ports 12, as explained in greater detail hereinafter.

The transition length 60 of each lateral offset 20 is measured as a length of each of the lateral offsets 20 in the longitudinal direction of the tube 10. FIGS. 3A and 3B illustrate the lateral offset 20 as having no transition length 60 because in each case the lateral offset 20 is illustrated as being arranged perpendicular to the longitudinal axis of the tube 10. In contrast, the lateral offset 20 is illustrated in FIG. 3C as having the transition length 60 extending in the longitudinal direction of the tube 10. Accordingly, the port 12 is shown as being arranged at an angle between 0 and 90 degrees relative to the longitudinal axis of the tube 10. This arrangement is also illustrated for a multi-port tube 10 in FIG. 2, which shows a tube 10 having five of the ports 12 arranged to extend at an angle relative to the longitudinal axis of the tube 10 at each of the lateral offsets 20a, 20b, 20c, 20d.

Referring back to FIG. 2, the first lateral offset 20a and the third lateral offset 20c are each shown as extending in a first direction perpendicular to the longitudinal axis of the tube 10 as the tube 10 continues from the first end 1 to the second end 2 thereof. In contrast, the second lateral offset 20b and the fourth lateral offset 20d are each shown as extending in a second direction perpendicular to the longitudinal axis of the tube 10 as the tube 10 continues from the first end 1 to the second end 2 thereof, wherein the second direction extends in a direction opposite the first direction. Accordingly, the lateral offsets 20a, 20b, 20c, 20d are arranged in an alternating pattern wherein adjacent ones of the lateral offsets 20a, 20b, 20c, 20d extend in opposite directions perpendicular to the longitudinal axis of the tube 10. Additionally, each of the lateral offsets 20a, 20b, 20c, 20d may have substantially equal offset lengths 50 to cause the first segment 30a, the third segment 30b, and the fifth segment 30e to be substantially aligned with each other in the longitudinal direction of the tube 10 while the second segment 30b and the fourth segment 30d are similarly aligned with each other in the longitudinal direction of the tube 10.

Accordingly, the tube 10 may be formed in an alternating fashion wherein every other segment 30 of the tube 10 is aligned with each other. If each of the lateral offsets 20 formed within the tube 10 have substantially the same offset length 50 and the lateral offsets 20 are arranged in alternating fashion as shown in FIG. 2, it should be understood that any tube 10 having an odd number of the segments 30 and an even number of the lateral offsets 20 will result in each of the outermost disposed segments 30 of the tube 10 being substantially aligned with each other. This arrangement may be beneficial as it allows a heat exchanger having the tube 10 utilized therein to be formed in a symmetrical manner wherein an inlet and an outlet of the tube 10 are aligned with each other, which may affect the manner in which such a heat exchanger can be packaged into an associated system. Additionally, the symmetry of the tubes 10 may further promote a simplified manufacturing process for a heat exchanger having the tubes 10.

Although the tube 10 has been described as having an even number of lateral offsets 20 that all share the same offset length 50, it should be understood that the tube 10 may have any number of the lateral offsets 20 and the lateral offsets 20 may be arranged in a variety of directions perpendicular to the longitudinal axis of the tube 10 while remaining within the scope of the present invention. Additionally, the tube 10 may have any variety or combination of offset lengths 50 and transition lengths 60, as desired. Each of the segments 30 of the tube 10 may be formed to have substantially the same length in the longitudinal direction of the tube 10 or the segments 30 may be formed to have variable lengths, as desired. If each of the segments 30 is formed to have substantially the same length, the length of each segment 30, and hence the frequency with which the lateral offsets 20 are formed in the tube 10, may be selected in accordance with desired flow conditions of a fluid flowing within the ports 12 of the tube 10. The frequency of the occurrence of the lateral offsets 20 formed in the tube 10 may for instance be selected to promote a desired degree of turbulence within each port 12 of the tube 10, as explained in greater detail hereinafter. In other embodiments, the frequency of the occurrence of the lateral offsets 20 may be variable along some regions or an entirety of the tube 10 and may be constant along other regions of the tube 10, as desired.

Referring back to FIG. 4, a pair of the tubes 10 is shown at an angle directed at the first end 1 of each of the tubes 10, wherein the pair of the tubes 10 is arranged in a configuration suitable for use in a heat exchanger such as the heat exchanger 5. As described hereinabove, the tubes 10 are shown as having five of the ports 12 aligned with each other in the elongated direction of the cross-section of the tube 10. Each of the tubes 10 may include an outer wall 80 comprising a first major portion 81, a second major portion 82, a first short portion 83, and a second short portion 84. The first major portion 81 and the second major portion 82 are arranged in parallel to each other and are formed on opposing sides of the linear array of the ports 12. The first short portion 83 and the second short portion 84 are similarly arranged in parallel to each other and are formed at opposing ends of the linear array of the ports 12. A plurality of dividing walls 85 extends from the first major portion 81 to the second major portion 82 to divide the interior of each of the tubes 10 into the plurality of ports 12.

The first lateral offset 20a illustrated in FIG. 4 connects the first segment 30a to the second segment 30b of each of the tubes 10. The first lateral offset 20a is shown as having the offset length 50, causing the first short portion 83 of the outer wall 80 of the second segment 30b to be spaced apart from the first short portion 83 of the outer wall 80 of the first segment 30a by the offset length 50.

The tubes 10 are also shown as having a surface area increasing feature 70 disposed on each of the first major portion 81 and the oppositely arranged second major portion 82 of the outer wall 80 of each of the tubes 10. The surface area increasing feature 70 may be in the form of the plurality of angled and alternatingly arranged fins 8 extending between adjacent ones of the tubes 10, as shown in FIG. 1. Accordingly, it should be understood that one of the surface area increasing features 70 may extend from the first major portion 81 of the outer wall 80 of one of the tubes 10 to the second major portion 82 of the outer wall 80 of an adjacent one of the tubes 10 when the tubes 10 are spaced apart and arranged in parallel to each other.

The surface area increasing feature 70 is shown as having one of a first width $W_1$ or a second width $W_2$. The first width $W_1$ of the surface area increasing feature 70 may be substantially equal to a width of each of the tubes 10 along any one segment 30 thereof as measured from the first short portion 83 to the second short portion 84 in the direction that the first major portion 81 and the second major portion 82 extend. For example, the surface area increasing feature 70 illustrated in FIG. 4 having the first width $W_1$ may be disposed on and correspond in width to either of the first major portion 81 or the second major portion 82 of the outer wall 80 of one of the tubes 10 along the first segment 30a thereof. The surface area increasing feature 70 may then extend along a length of the tube 10 in the direction of the longitudinal axis of the tube 10. Accordingly, the surface area increasing feature 70 may be substantially aligned with and abut one of the first major portion 81 or the second major portion 82 of the outer wall 80 along each of the first segment 30a, the third segment 30c, and the fifth segment 30e. The second segment 30b and the fourth segment 30d may then be laterally offset from the first, third, and fifth segments 30a, 30c, 30e by the offset length 50, meaning that a portion of each of the second segment 30b and the fourth segment 30d will extend laterally beyond the surface area increasing feature 70 by the offset length 50.

In other embodiments, the surface area increasing feature 70 may instead have the second width $W_2$, wherein the second width $W_2$ is substantially equal to the width of one of the tubes 10 from the first short portion 83 to the second short portion 84 along any segment 30 thereof plus the offset length 50 formed between adjacent segments 30 of the tube 10. In other words, the second width $W_2$ may be substantially equal to the first width $W_1$ plus the offset length 50 formed between each adjacent segment 30 of each of the tubes 10. The surface area increasing feature 70 may accordingly extend from the first short portion 83 of the second segment 30b to the second short portion 84 of the first segment 30a in a direction perpendicular to the longitudinal axis of the tube 10. The surface area increasing feature 70 may accordingly extend laterally beyond a portion of the tube 10 in alternating fashion after each subsequent lateral offset 20 formed in the tube 10. For example, as shown in FIG. 4, the surface area increasing feature 70 having the second width $W_2$ extends laterally beyond the first short portion 83 of the outer wall of each of the tubes 10 along the first segment 30a. The surface area increasing feature 70 having the second width $W_2$ advantageously allow for the first major portion 81 and the second major portion 82 of the outer wall of each of the tubes 10 to be in contact with one of the surface area increasing features 70 along an entirety of a length of each of the tubes 10 in the longitudinal direction, including all five of the segments 30a, 30b, 30c, 30d, 30e of the tube 10. Although FIG. 4 depicts the pair of tubes 10 as having surface area increasing features 70 having both the first width $W_1$ and the second width $W_2$, it should be understood that a heat exchanger utilizing a plurality of the tubes 10 may include surface area increasing features 70 having one constant width throughout, as desired.

Referring still to FIG. 4, the ports 12 formed in the tube 10 may be formed to have different cross-sectional flow areas depending on a position of each port 12 relative to the outer wall of the tube 10. The varying cross-sectional flow areas may be selected to more evenly distribute the stresses occurring within the ports 12 due to the internal pressure of a fluid flowing through the tube 10. The ports 12 may, for example, include a first outermost port 14 formed adjacent the first short portion 83 of the outer wall 80, a second outermost port 16 formed adjacent the second short portion 84 of the outer wall 80, and at least one inner port 18 formed between the first outermost port 14 and the second outermost port 16. The first outermost port 14 and the second outermost port 16 may be selected to have a larger or smaller cross-sectional flow area than do any of the at least one inner ports 18. Each of the ports 12 may have substantially the same height as measured between the first major portion 81 and the second major portion 82 of the outer wall 80 due to the configuration of the tube 10, hence the cross-sectional flow areas of the first outermost port 14 and the second outermost port 16 may be increased or decreased relative to the inner ports 18 by increasing or decreasing a width of the first outermost port 14 and the second outermost port 16 relative to the inner ports 18. The first outermost port 14 and the second outermost port 16 may each accordingly have an outermost port width $W_o$ that is greater or lesser in width than an inner port width $W_i$ of the inner ports 18. In other embodiments, the outermost ports 14, 16 have the outermost port width $W_o$ while each subsequent pair of ports 12 formed toward a center of the plurality of ports 12 has a width that is a ratio of the width of the ports 12 formed immediately exterior thereto, wherein the ratio may imply ports 12 that increase or decrease in cross-sectional flow area towards a center of the array of the ports 12. For example, with reference to the five ports 12 shown in FIG. 3, the outermost ports 14, 16 may have the outermost port width $W_o$, the ports 12 formed adjacent to the outermost ports 12 may have a width that is a ratio of the outermost port width $W_o$, such as being three fourths (¾) the width of the outermost port width $W_o$, and the center port 12 may have a width that is a ratio of the ports 12 surrounding the center port 12, such as being nine sixteenths (9/16) of the width of the outermost port width $W_o$. In contrast, a width of each of the ports 12 may decrease in a direction towards the outermost ports 14, 16, as desired. It should be understood that the ports 12 formed in the tube 10 may have other configurations including a different port width for each of the ports 12 formed in the tube 10, as desired. Additionally, it should be understood that each of the ports 12 may have any suitable cross-sectional shape and arrangement while remaining within the scope of the invention, as desired.

In use, the first fluid enters the inlet header 6 of the heat exchanger 5 where the first fluid is distributed to each port 12 of each of the tubes 10 at the first end 1 thereof. The first fluid flows linearly through the first segment 30a before being redirected in a lateral direction by the first lateral offset 20a. The first fluid then enters the second segment 30b where the first fluid again flows in a substantially linear direction before proceeding to the second lateral offset 20b and then the third segment 30c. As should be understood, the first fluid continues on through the third segment 30c, the third lateral offset 20c, the fourth segment 30d, the fourth lateral offset 20*d*, and the fifth segment 30*e* before exiting each of the tubes 10 at the second end 2 thereof and entering the outlet header 7, wherein each independent flow of the first fluid through each of the ports 12 of the tubes 10 is recombined before exiting the heat exchanger 5. As the first fluid proceeds through each of the ports 12, the second fluid is caused to flow between each of the spaced apart tubes 10 to exchange heat with the first fluid via the outer wall 80 of each of the tubes 10. As shown in FIGS. 1 and 4, the second fluid may also be caused to flow over or around a surface area increasing feature 70 that is arranged between adjacent ones of the tubes 10. The surface area increasing feature 70 may be in the form of the plurality of alternatingly arranged fins 8, for example. The surface area increasing feature 70 allows heat energy within the outer wall 80 of each of the tubes 10 to be further distributed through the surface area increasing feature 70 to increase a total surface area of the components of the heat exchanger 5 exposed to and exchanging heat with the second fluid, thereby increasing a heat exchange efficiency of the heat exchanger 5.

The presence of the lateral offsets 20 advantageously causes a heat exchanger 5 having the tubes 10 to have an increased heat exchange efficiency by increasing a turbulence of the first fluid as the first fluid proceeds through each of the segments 30*a*, 30*b*, 30*c*, 30*d*, 30*e* of the tube 10. The increased heat exchange efficiency occurs because a fluid having a laminar flow through a passageway such as one of the ports 12 tends to promote less convective heat transfer at the interior surface defining the passageway than does a fluid flowing therethrough having a turbulent flow. During laminar flow, the fluid tends to flow substantially parallel to the interior surface of the passageway forming the boundary layer, causing only that fluid immediately adjacent the boundary layer to exchange heat primarily via conductive heat transfer with the surface defining the passageway. The parallel flow leads to a lack of mixing of the fluid within the passageway, meaning that the amount of convective heat transfer occurring within the passageway is minimal. Accordingly, it can be beneficial to increase the turbulence of the flow through a heat exchanger passageway to increase the degree of mixing of the fluid, which can in turn promote heat transfer between the fluid within a central region of the passageway and the fluid at the boundary layer or may cause the fluid flowing through the central region of the passageway to be drawn to the boundary layer by the formation of eddies within the fluid flow.

The lateral offsets 20 cause the first fluid to repeatedly change direction at the transition from one segment 30 to another adjacent segment 30 of each of the tubes 10, thereby promoting mixing of the first fluid as it proceeds through each change in direction. Portions of the first fluid may also strike the interior surface of each of the ports 12 as the first fluid continues on to the next segment 30 of the tube 10, thereby causing the first fluid at the boundary forming the interior surface of each of the ports 12 to further mix with the first fluid within a central region of each of the ports 12, thereby promoting additional mixing between different portions of the first fluid within each of the ports 12.

Figure 6:
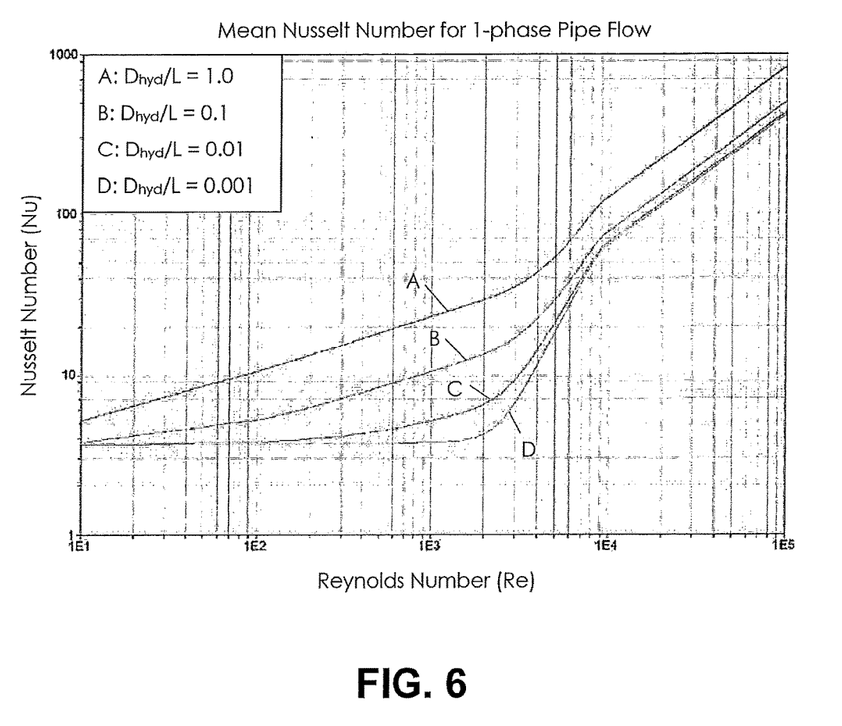
FIG. 6 is a graph illustrating the relationship between the Nusselt number and the Reynolds number for 1-phase flow through a pipe having a predetermined hydraulic diameter to length ratio.

The presence of the lateral offsets 20 in each of the tubes 10 also increases the heat exchange efficiency of the heat exchanger 5 when compared to a heat exchanger comprising entirely linearly arranged tubes due to a change in a local apparent length of each of the segments 30 of the tube 10. FIG. 6 illustrates the relationship between the Nusselt number (Nu) and the Reynolds number (Re) at different hydraulic tube diameter ($D_{hyd}$) to length (L) ratios ($D_{hyd}/L$) within a one-phase pipe flow. When comparing a tube 10 having the lateral offsets 20 to a linearly arranged tube devoid of the lateral offsets 20, but otherwise substantially similar, the lateral offsets 20 cause the tube 10 to be divided into a plurality of the segments 30 having a shorter locally apparent length than the total length of the linearly arranged tube devoid of the lateral offsets 20. Accordingly, each segment 30 of the tube 10 has a greater hydraulic tube diameter to length ratio than does the tube devoid of the lateral offsets 20. As shown in FIG. 6, a greater hydraulic tube diameter to length ratio at a given Reynolds number results in a higher Nusselt number. The Nusselt number represents a ratio of the convective heat transfer to the conductive heat transfer of a fluid across a boundary, such as interior surface of one of the ports 12. As such, a higher Nusselt number corresponds to a greater degree of convective heat transfer, which in turn promotes greater heat transfer through a passageway wall such as the tube wall 80 than does pure conductive heat transfer under similar conditions. Accordingly, the introduction of the lateral offsets 20, and hence the distinctly offset segments 30, causes each of the ports 12 to be divided into a plurality of linearly arranged segments that in combination promote greater heat transfer than would a similar tube being linearly arranged along the same length.

Figure 5:
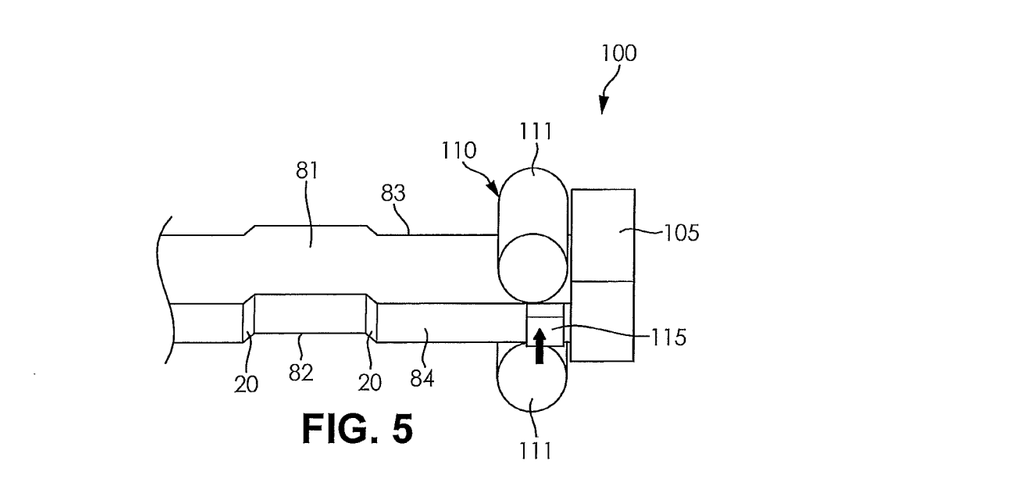
FIG. 5 is a fragmentary front perspective view of a system for forming one of the heat exchanger tubes illustrated in FIGS. 1-4.

Referring now to FIG. 5, a system 100 for producing one of the tubes 10 is illustrated. The system 100 includes an extrusion die or fixture 105, a constraining means 110, and an offset introducing means 115. The extrusion die 105 may be any known form of device suitable for extruding material to have a predetermined cross-sectional shape based on a cross-sectional shape of the outlet of the die, for example. Accordingly, the extrusion die 105 may be configured to produce the main body of the tube 10 including the outer wall 80 and each of the dividing walls 85 during an extrusion process, thereby forming the array of linearly arranged ports 12 within each of the tubes 10. As should be understood, the extrusion die 105 may be configured to extrude material therefrom in a first direction extending parallel to the longitudinal axis of each of the tubes 10 as they are extruded from the extrusion die 105.

The constraining means 110 is shown in FIG. 5 as a pair of rollers 111 disposed to either side of the tube 10 and constraining movement of the recently extruded tube 10 in a second direction perpendicular to the first direction in which each of the tubes 10 are extruded from the extrusion die 105. Each of the rollers 111 extends in a third direction perpendicular to both the first direction of the extrusion and the constrained second direction, causing each of the rollers 111 to also include an axis of rotation that extends in the third direction. The rollers 111 are shown as contacting each of the first major portion 81 and the second major portion 82 of the outer wall 80 of the tube 10 to constrain the tube 10 in the second direction. It should be understood, however, that in addition to the rollers 111, the constraining means 110 may be any device, guide, or structure suitable for constraining relative motion of the tube 10 in the second direction during the extrusion of one of the tubes 10.

The offset introducing means 115 is configured to apply a lateral force to the tube 10 along a third direction perpendicular to both the first direction and the second direction either during the extrusion process or immediately following the extrusion of one of the tubes 10. The offset introducing means 115 is shown in FIG. 5 as having a surface immediately adjacent or abutting one of the first short portion 83 or the second short portion 84 of the tube wall 80 as the tube 10 is extruded from the extrusion die 105. The offset introducing means 115 may also be disposed on an opposing side of the tube 10 to allow for forces to be applied to both the first short portion 83 and the second short portion 84 in alternating fashion. Accordingly, the offset introducing means 115 may be configured to reciprocate along the third direction to introduce subsequent lateral offsets 20 to the tube 10 during the extrusion process. Although the offset introducing means 115 is shown in FIG. 5 as a block or die having a substantially planar surface formed adjacent the tube 10, it should be understood that the offset introducing means 115 may be any suitable component capable of applying a lateral force to the tube 10. For example, the offset introducing means 115 may be a patterned roller (not shown) having an axis of rotation extending in the second direction (the constrained direction) and an outer surface of the roller in contact with one of the first short portion 83 and the second short portion 84. The patterned roller may be configured to apply a varying lateral force to the tube 10 based on a radius of the roller changing about a circumference of the roller as the roller rotates during contact with the tube 10.

In use, the tube 10 is extruded from the extrusion die 105 in the first direction and towards both the constraining means 110 and the offset introducing means 115. The constraining means 110 constrains motion of the recently extruded tube 10 along the second direction by applying a force to each of the first major portion 81 and the second major portion 82 of the tube wall 80. The mechanical constraints placed on the tube 10 may be used to minimize any out of plane deformations of the tube 10 while the offset introducing means 115 is applying alternating mechanical forces to the tube 10 in the third direction. Once constrained, the offset introducing means 115 applies a force to one of the first short portion 83 or the second short portion 84 in the third direction to introduce a lateral offset 20 to the tube 10. The offset introducing means 115 may also be caused to reciprocate back and forth to introduce a plurality of the lateral offsets 20 into the tube 10 in alternating fashion to create the tube 10 having the first end 1 and the second end 2 that are in alignment, as desired. If a patterned roller or pair of patterned rollers are used, the varying patterns formed on the rollers may be caused to form the alternating lateral offsets 20 by means of the varying radii of the rollers as they revolve. In either case, the offset introducing means 115 mechanically deforms the tube 10 during or immediately after the extrusion process to create the plurality of segments 30 separated by the plurality of lateral offsets 20.

It should be understood that the lateral offsets 20 may also be introduced into the tube 10 at any time following the extrusion process thereof, including in a separate process not involving the system 100, so long as the lateral offsets 20 are formed to create suitable flow characteristics within the tube 10 in the manner described hereinabove.

The introduction of the lateral offsets 20 into the tube 10 allows for the tube 10 to be manufactured in a manner that is cost effective, less complex, and does not require the utilization of a separated manufactured insert or feature for use on or within the tube 10. The lateral offsets 20 beneficially separate the tube 10 into a plurality of segments 30 that promote additional turbulence within a fluid flowing through the ports 12 of the tube 10, which in turn improves a heat exchange efficiency of the tube 10. The dimensions of the tube 10 and its associated features may be selected to produce desirable flow characteristics within the ports 12 of the tube 10, including maximizing a flow rate therethrough, minimizing a pressure drop therein, and maximizing the degree of heat transfer therefrom.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A tube for use in a heat exchanger, the tube comprising:
a main body having a longitudinal axis and a first end and a second end, at least one port formed through the main body from the first end to the second end for conveying a fluid therethrough, the at least one port formed in the main body divided into a plurality of longitudinally extending segments and a plurality of transition segments interconnecting the longitudinally extending segments;
wherein each of the longitudinally extending segments of the at least one port is offset laterally from an adjacent one of the longitudinally extending segments, and wherein each of the transition segments of the at least one port extends substantially orthogonally relative to the longitudinal axis of the main body.

2. The tube according to claim 1, wherein the main body includes a plurality of the ports formed therein, each of the ports arranged next to one another in a linear array extending transverse to the longitudinal axis of the main body.

3. The tube according to claim 2, wherein each of the longitudinally extending segments of each of the ports is offset laterally from the adjacent one of the longitudinally extending segments in a same direction the linear array of the ports extends.

4. The tube according to claim 2, wherein the ports formed at lateral outermost ends of the linear array have a different cross-sectional flow area than at least one port formed between the ports formed at the lateral outermost ends of the linear array.

5. The tube according to claim 1, wherein every other one of the longitudinally extending segments of the at least one port is in alignment with each other in the longitudinal direction of the main body.

6. The tube according to claim 5, wherein one of the longitudinally extending segments formed at the first end of the main body is in alignment with one of the longitudinally extending segments formed at the second end of the main body.

7. The tube according to claim 1, wherein each of the longitudinally extending segments of the at least one port has an equal length.

8. A heat exchanger comprising:
an inlet header;
an outlet header; and
a plurality of tubes, wherein each of the tubes includes a main body having a longitudinal axis and a first end and a second end, at least one port formed through the main body from the first end to the second end for conveying a fluid therethrough, the at least one port formed in the main body divided into a plurality of longitudinally extending segments and a plurality of transition segments interconnecting the longitudinally extending segments, wherein each of the longitudinally extending segments of the at least one port is offset laterally from an adjacent one of the longitudinally extending segments, and wherein each of the transition segments of the at least one port extends substantially orthogonally relative to the longitudinal axis of the main body.

9. The heat exchanger according to claim 8, wherein a surface area increasing feature is disposed between adjacent ones of the tubes.

10. The heat exchanger according to claim 9, wherein the surface area increasing feature has a width substantially equal to one of a width of the main body along one of the longitudinally extending segments of the at least one port or the width of the main body along one of the longitudinally extending segments of the at least one port plus a distance an adjacent one of the longitudinally extending segments is offset laterally from the one of the longitudinally extending segments.

11. The heat exchanger according to claim 8, wherein a longitudinally extending segment of the at least one port of each of the tubes fluidly coupled to the inlet header is aligned with the a longitudinally extending segment of the at least one port of each of the tubes fluidly coupled to the outlet header.

12. The heat exchanger according to claim 8, wherein each of the tubes is formed in an extrusion process and each of the at least one ports is a void in the main body formed during the extrusion process.

* * * * *